(No Model.)

W. J. TAYLOR.
CAR WHEEL, &c.

No. 578,662. Patented Mar. 9, 1897.

WITNESSES:
F. W. Wright
S. C. Connor

INVENTOR
William J. Taylor
BY
Howson & Howson
ATTORNEY

UNITED STATES PATENT OFFICE.

WILLIAM J. TAYLOR, OF BOUND BROOK, NEW JERSEY, ASSIGNOR TO THE TAYLOR IRON AND STEEL COMPANY, OF HIGH BRIDGE, NEW JERSEY.

CAR-WHEEL, &c.

SPECIFICATION forming part of Letters Patent No. 578,662, dated March 9, 1897.

Application filed January 4, 1897. Serial No. 617,970. (No model.)

*To all whom it may concern:*

Be it known that I, WILLIAM J. TAYLOR, a citizen of the United States of America, and a resident of Bound Brook, Somerset county, State of New Jersey, have invented an Improved Car-Wheel or Similar Article, of which the following is a specification.

My invention relates to the bushing of wheels or similar articles made of manganese steel or other metal which is too hard to be practically machined when a true bore is required in the hub or other hole in the hard-metal casting. The usual way of bushing such an article has been to cast it about the soft-metal bushing. There are certain objections to this method, however, and among such objections one is that to prevent the bursting of the casting by the contraction of the latter and the simultaneous expansion of the bushing the hub of the casting has to be made undesirably thick. Another objection is that with the casting method of applying the bushing certain metals (such as brass) having superior antifriction qualities cannot be used for the bushing.

The main objects of my present invention are to so construct the bushed wheel or other article as to permit of the use of as light a hub as may be desired, and also to permit of the employment of any ductile machinable metal which may be desired for the bushing.

Figure 1:
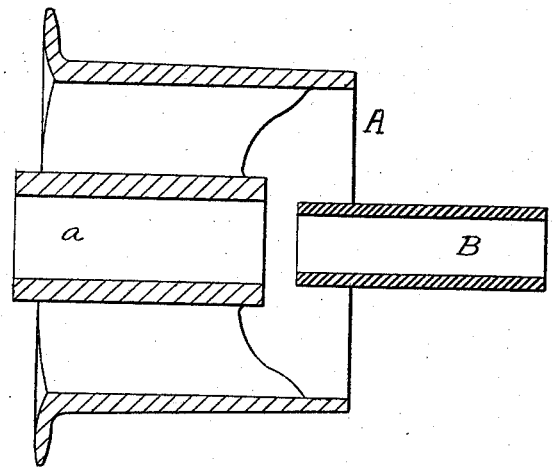
Figure 2:
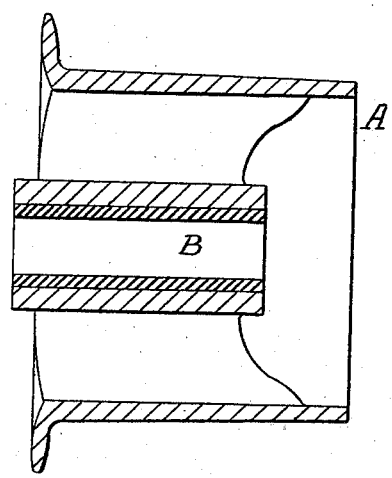
Figure 3:
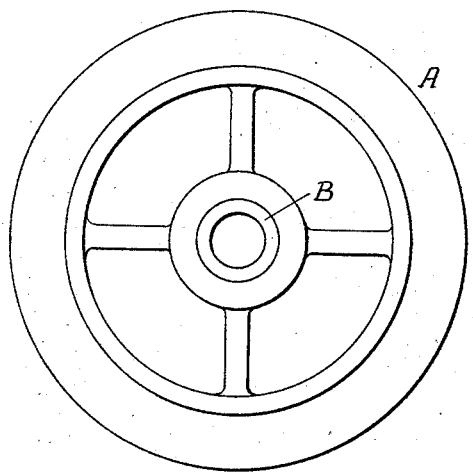

In the accompanying drawings, Figure 1 is a sectional view illustrating a form of wheel to which my invention may be applied, this figure showing the wheel before the bushing is inserted. Fig. 2 is a similar view showing the bushing inserted and expanded into place. Fig. 3 is a face view of the finished wheel, and Fig. 4 is a sectional view of a modification.

In carrying out my invention the wheel or other article A, of manganese steel or other hard metal, is cast in the usual manner, but with the hole $a$, which has to be bushed, cast sufficiently larger in diameter than the intended finished size of the hole as to admit of the presence of the bushing. This hole $a$ is then smoothed out roughly, simply to take off protuberances. The bushing B, of brass or other suitable ductile machinable metal, is now to be inserted. It is preferable to have this a tight or forcing fit, and the bushing may be forced in by a hydraulic press or otherwise. The bushing B having been inserted into the hole is now expanded therein by means of a suitable tube-expanding tool until the bushing fits the hole with sufficient tightness necessary for the service in view.

Figure 4:
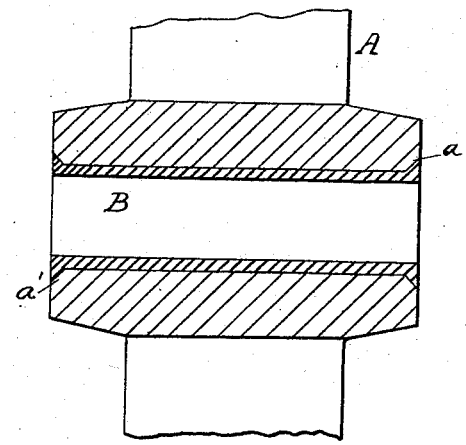

It is also desirable in some cases to have the hole $a$ in the casting slightly countersunk at each end, as indicated at $a'$ $a'$, Fig. 4, so that the inserted bushing may be expanded into the countersinks to prevent any possible longitudinal movement of the bushing in the hole in the casting when in service.

After the bushing has been expanded into place in the hole in the casting it is bored out true in the usual manner to be fitted to its intended shaft or axle.

I claim as my invention—

A car-wheel or other such article of manganese steel or other metal which cannot be practically machined, said article having a metal bushing of machinable ductile metal expanded into place in its hub, substantially as described.

In testimony whereof I have signed my name to this specification in the presence of two subscribing witnesses.

WILLIAM J. TAYLOR.

Witnesses:
 HENRY D. HIBBARD,
 F. BUDLONG.